United States Patent
Kang

(10) Patent No.: US 11,961,246 B2
(45) Date of Patent: Apr. 16, 2024

(54) DEPTH IMAGE PROCESSING METHOD AND APPARATUS, ELECTRONIC DEVICE, AND READABLE STORAGE MEDIUM

(71) Applicant: GUANGDONG OPPO MOBILE TELECOMMUNICATIONS CORP., LTD., Dongguan (CN)

(72) Inventor: Jian Kang, Dongguan (CN)

(73) Assignee: GUANGDONG OPPO MOBILE TELECOMMUNICATIONS CORP. LTD, Dongguan (CN)

( * ) Notice: Subject to any disclaimer, the term of this patent is extended or adjusted under 35 U.S.C. 154(b) by 340 days.

(21) Appl. No.: 17/548,181

(22) Filed: Dec. 10, 2021

(65) Prior Publication Data

US 2022/0101547 A1  Mar. 31, 2022

Related U.S. Application Data

(63) Continuation of application No. PCT/CN2020/097516, filed on Jun. 22, 2020.

(30) Foreign Application Priority Data

Jul. 11, 2019 (CN) .......................... 201910626054.1

(51) Int. Cl.
*G06K 9/00* (2022.01)
*G06T 5/00* (2006.01)
*G06T 7/50* (2017.01)

(52) U.S. Cl.
CPC ................ *G06T 7/50* (2017.01); *G06T 5/002* (2013.01); *G06T 2207/10028* (2013.01)

(58) Field of Classification Search
CPC .. G06T 7/50; G06T 5/002; G06T 2207/10028
See application file for complete search history.

(56) References Cited

U.S. PATENT DOCUMENTS 8,553,972 B2 * 10/2013 Kim .......................... G06T 7/50
348/43
10,212,408 B1   2/2019 Pappas-Katsiafas et al.
(Continued)

FOREIGN PATENT DOCUMENTS

CN   101630408 A  *  1/2010
CN   101630408 A     1/2010
(Continued)

OTHER PUBLICATIONS

Robust human activity recognition from depth video using spatiotemporal multi-fused features, Ahmad Jalal et al., Elsevier, 2017, pp. 295-308 (Year: 2017).*

(Continued)

*Primary Examiner* — Jayesh A Patel
(74) *Attorney, Agent, or Firm* — Sheppard, Mullin, Richter & Hampton, LLP

(57) ABSTRACT

Provided are a depth image processing method, a depth image processing apparatus, an electronic device and a readable storage medium. The method includes: (101) obtaining consecutive n depth image frames; (102) determining a trusted pixel and determining a smoothing factor corresponding to the trusted pixel; (103) determining a time similarity weight; (104) determining a content similarity; (105) determining a content similarity weight based on the content similarity and the smoothing factor; and (106) performing filtering processing on a depth value of the trusted pixel based on all time similarity weights and all content similarity weights.

20 Claims, 4 Drawing Sheets

(56) References Cited

U.S. PATENT DOCUMENTS

| | | | | |
|---|---|---|---|---|
| 2010/0141757 A1* | 6/2010 | Baik | ................. | H04N 13/139 |
| | | | | 382/106 |
| 2010/0309201 A1* | 12/2010 | Lim | ................. | G06T 5/50 |
| | | | | 345/419 |
| 2011/0273529 A1* | 11/2011 | Lai | ................. | H04N 13/122 |
| | | | | 348/42 |
| 2012/0121162 A1* | 5/2012 | Kim | ................. | G06T 5/20 |
| | | | | 382/154 |
| 2013/0162629 A1* | 6/2013 | Huang | ................. | H04N 13/128 |
| | | | | 345/419 |
| 2013/0242043 A1 | 9/2013 | Yang et al. | | |
| 2014/0118494 A1* | 5/2014 | Wu | ................. | G06T 7/20 |
| | | | | 348/E13.02 |
| 2014/0270485 A1* | 9/2014 | Kauff | ................. | G06T 5/002 |
| | | | | 382/154 |
| 2016/0042519 A1* | 2/2016 | Wu | ................. | G06T 7/50 |
| | | | | 345/419 |
| 2017/0193830 A1* | 7/2017 | Fragoso | ................. | G08G 5/045 |
| 2018/0204307 A1* | 7/2018 | Schied | ................. | G06T 1/20 |
| 2018/0322646 A1* | 11/2018 | Matthies | ................. | G06V 10/763 |

FOREIGN PATENT DOCUMENTS

| | | | | | |
|---|---|---|---|---|---|
| CN | 102184531 | A | | 9/2011 | |
| CN | 102542541 | A | | 7/2012 | |
| CN | 102819837 | A | | 12/2012 | |
| CN | 104683783 | A | | 6/2015 | |
| CN | 105915886 | A | | 8/2016 | |
| CN | 106355552 | A | | 1/2017 | |
| CN | 108269280 | A | | 7/2018 | |
| CN | 108765477 | A | | 11/2018 | |
| CN | 109191506 | A | * 1/2019 | ............. G06T 5/002 |
| CN | 109191506 | A | | 1/2019 | |
| CN | 109767467 | A | | 5/2019 | |
| CN | 110400344 | A | | 11/2019 | |
| CN | 110400344 | A | * 11/2019 | ............. G06T 5/002 |
| EP | 2568440 | A1 | * 3/2013 | ........... G06T 7/0065 |
| WO | WO-2016193393 | A1 | * 12/2016 | |

OTHER PUBLICATIONS

Marker-Less Piano Fingering Recognition using Sequential Depth Images, Akiya Oka et al., IEEE, 2013, pp. 1-4 (Year: 2013).*
Consistent Depth Maps Recovery from a Video Sequence, Guofeng Zhang et al., IEEE, 2009, pp. 974-988 (Year: 2009).*
Action Recognition Based on Depth Image Sequence, Liangcan Liao et al., IEEE, 2017, pp. 1-5 (Year: 2017).*
Directional Joint Bilateral Filter for Depth Images, Anh Vu Le et al., Sensors, 2014, pp. 11362-11378 (Year: 2014).*
Smoothing depth maps for improved steroscopic image quality, Wa James Tam et al., SPIE, 2004, pp. 162-172 (Year: 2004).*
Extended European Search Report dated Jul. 8, 2022 received in European Patent Application No. EP 20837729.1.
Cheng et al: "A novel structure-from-motion strategy for refining depth map estimation and multi-view synthesis in 3DTV", Multimedia and Expo (ICME) , 2010 IEEE International Conference on , IEEE, Piscataway , NJ, USA, Jul. 19, 2010 (Jul. 19, 2010) ,XP031761689.
Fu et al: "Kinect-like depth denoising" , 2012 IEEE International Sympos Ium on C Ircuits and Systems , [Online] May 2012 (May 2012) , pp. 512-515 ,XP055901981.
First Office Action from corresponding Chinese Application No. 201910626054.1, dated Jan. 15, 2021. English translation is attached.
International Search Report and Written Opinion dated Sep. 22, 2020 in International Application No. PCT/CN2020/097516. English translation is attached.
Grant Notice from corresponding Chinese Application No. 201910626054.1, dated May 14, 2021. English translation is attached.

* cited by examiner

DEPTH IMAGE PROCESSING METHOD AND APPARATUS, ELECTRONIC DEVICE, AND READABLE STORAGE MEDIUM

CROSS-REFERENCE TO RELATED APPLICATIONS

The present application is a continuation of International Application No. PCT/CN2020/097516 filed on Jun. 22, 2020, which claims priority and benefit to Chinese Patent Application No. 201910626054.1, filed on Jul. 11, 2019 to the China National Intellectual Property Administration, the content of which is incorporated herein by reference in its entirety.

FIELD

The present disclosure relates to the field of image processing technology, and more particularly, to a depth image processing method, a depth image processing apparatus, an electronic device, and a readable storage medium.

BACKGROUND

Generally, when measuring the depth of an object based on a Time of flight (ToF) sensor, the ToF sensor determines a distance between the sensor and an object by calculating the time of flight of a pulse signal, and then determines a depth value of the object based on the distance. However, various uncertainties in the measurement process have brought about various errors. Although the various errors have been corrected in the offline calibration stage, the large randomness of these errors has caused a ToF depth measurement error of about 1% within the measurement range. When calculating the depth value of the object, the depth value is smoothed based on the fixed depth measurement error.

SUMMARY

According to a first aspect, embodiments provide a depth image processing method. The method includes the following.

Consecutive n depth image frames containing a target depth image frame are obtained, wherein n is a natural number greater than 1.

A trusted pixel in the target depth image frame is determined in accordance with a preset strategy, and a smoothing factor corresponding to the trusted pixel is determined.

A time similarity weight of the target depth image frame with respect to each of other depth image frames other than the target image frame in the n depth image frames is determined.

A content similarity between the trusted pixel and a corresponding pixel in each of the other depth image frames in the n depth image frames is determined.

A content similarity weight of the trusted pixel with respect to the corresponding pixel in each of the other depth image frames in the n depth image frames is determined based on the content similarity and the smoothing factor.

Filtering processing is performed on a depth value of the trusted pixel based on the determined time similarity weights and the determined content similarity weights.

According to a second aspect, embodiments provide an electronic device. The electronic device includes a memory, a processor, and a computer program stored on the memory and executable on the processor. The computer program, when executed by the processor, implements the depth image processing method according to the first aspect.

According to a third aspect, embodiments provide a non-transitory computer-readable storage medium. The non-transitory computer-readable storage has a computer program stored thereon. The computer program, when executed by a processor, implements the depth image processing method according to the first aspect.

BRIEF DESCRIPTION OF DRAWINGS

The above and/or additional aspects and advantages of the present disclosure will become apparent and more readily appreciated from the following description made with reference to the accompanying drawings, in which.

DESCRIPTION OF EMBODIMENTS

Figure 1:
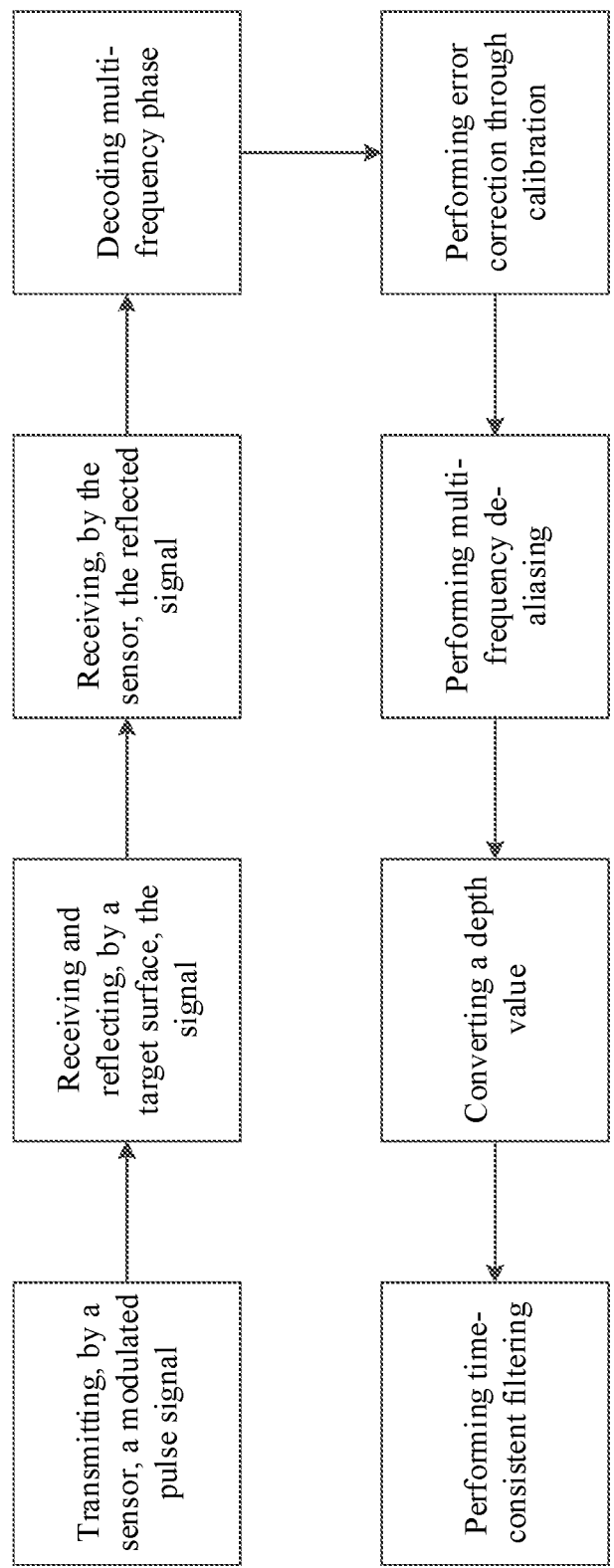
FIG. 1 is a schematic flowchart of a TOF-based depth image processing method according to an embodiment of the present disclosure.

The embodiments of the present disclosure are described in detail below. Examples of the embodiments are illustrated in the accompanying drawings, throughout which the same or similar reference numerals indicate the same or similar elements or elements with the same or similar functions. The embodiments described below with reference to the accompanying drawings are exemplary, and are intended to explain the present disclosure, but should not be understood as a limitation to the present disclosure.

Figure 4:
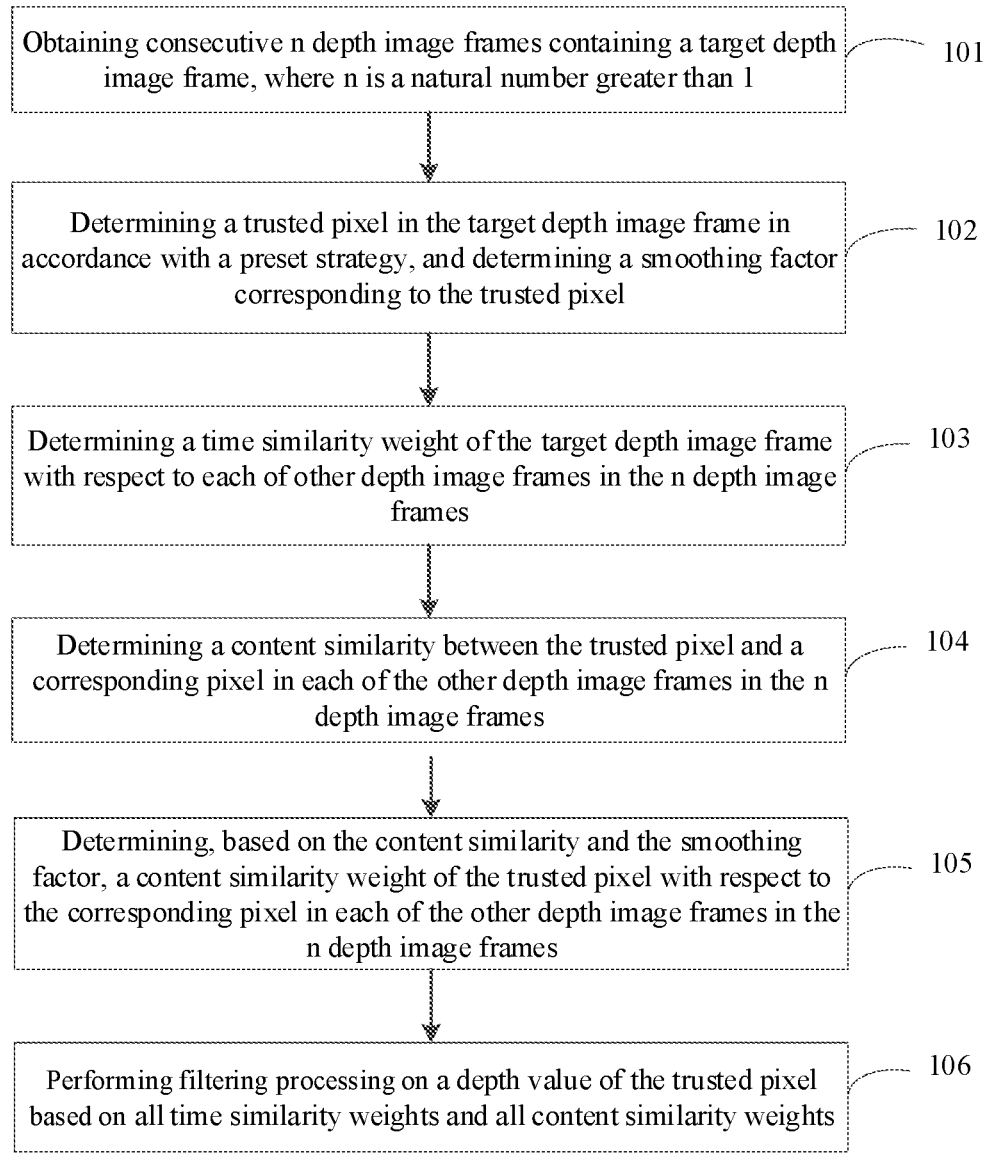
FIG. 4 is a flowchart of a depth image processing method according to an embodiment of the present disclosure.

As illustrated in FIG. 4, a depth image processing method according to an embodiment of the present disclosure includes following steps of: obtaining consecutive n depth image frames containing a target depth image frame, where n is a natural number greater than 1; determining a trusted pixel in the target depth image frame in accordance with a preset strategy, and determining a smoothing factor corresponding to the trusted pixel; determining a time similarity weight of the target depth image frame with respect to each of other depth image frames in the n depth image frames; determining a content similarity between the trusted pixel and a corresponding pixel in each of the other depth image frames in the n depth image frames; determining, based on the content similarity and the smoothing factor, a content similarity weight of the trusted pixel with respect to the corresponding pixel in each of the other depth image frames in the n depth image frames; and performing filtering processing on a depth value of the trusted pixel based on all time similarity weights and all content similarity weights.

In some embodiments, determining the trusted pixel in the target depth image frame in accordance with the preset strategy includes: obtaining a reference depth image frame adjacent to the target depth image frame; determining a depth difference between a depth value of each pixel in the target depth image frame and a depth value of a corresponding pixel in the reference depth image frame; determining whether the depth difference is smaller than or equal to a preset threshold; and determining the corresponding pixel as the trusted pixel when the depth difference is smaller than or equal to the preset threshold.

In some embodiments, determining the time similarity weight of the target depth image frame with respect to each of the other depth image frames in the n depth image frames includes: obtaining a sequence number of the target depth image frame among the consecutive n depth image frames; and obtaining the time similarity weight through calculation of the sequence number and n in accordance with a preset time weight formula.

In some embodiments, the preset time weight formula is:

$$w1_k = \frac{2(n-k)}{n(n+1)},$$

where $w1_k$ represents the time similarity weight, and k represents the sequence number.

In some embodiments, determining the content similarity between the trusted pixel and the corresponding pixel in each of the other depth image frames in the n depth image frames includes: obtaining a first confidence of the trusted pixel and a second confidence of the corresponding pixel in each of the other depth image frames, and calculating a confidence difference between the first confidence and the second confidence; obtaining a first gray value of the trusted pixel and a second gray value of the corresponding pixel in each of the other depth image frames, and calculating a gray value difference between the first gray value and the second gray value; obtaining a first weight coefficient corresponding to the confidence, and determining a second weight coefficient based on the first weight coefficient; and obtaining the content similarity based on the confidence difference, the gray value difference, the first weight coefficient, and the second weight coefficient.

In some embodiments, determining, based on the content similarity and the smoothing factor, the similarity weight of the trusted pixel with respect to the corresponding pixel in each of the other depth image frames in the n depth image frames includes: determining the content similarity weight of the trusted pixel with respect to the corresponding pixel in each of the other depth image frames in the n depth image frames through calculation of the content similarity and the smoothing factor in accordance with a preset similarity weight formula.

In some embodiments, the preset similarity weight formula is:

$$w2_k = s * \exp\left(-\frac{d * diff1^2 + (1-d) * diff2^2}{2\sigma^2}\right),$$

where s represents the smoothing factor, diff1 represents the confidence difference, diff2 represents the gray value difference, d represents the first weight coefficient, 1−d represents the second weight coefficient, and σ represents a product of a depth value of each trusted pixel and a preset standard error.

In some embodiments, performing filtering processing on the depth value of the trusted pixel based on all time similarity weights and all content similarity weights includes: smoothing the depth value of the trusted pixel based on a preset filtering formula and the time similarity weight, the content similarity weight and the depth value of the trusted pixel.

In some embodiments, the preset filtering formula is:

$$\sum_{k=0}^{n} w1_k * w2_k * dep_k,$$

where D represents a smoothed depth value of the trusted pixel, and $dep_k$ represents the depth value of the trusted pixel.

Figure 5:
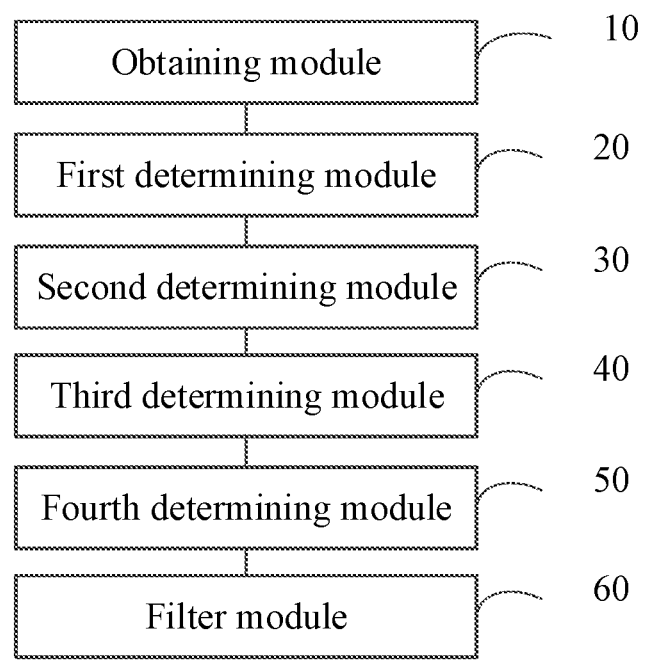
FIG. 5 is a schematic diagram of a structure of a depth image processing apparatus according to an embodiment of the present disclosure.

Referring to FIG. 5, a depth image processing apparatus according to an embodiment of the present disclosure includes an obtaining module 10, a first determining module 20, a second determining module 30, a third determining module 40, a fourth determining module 50, and a filter module 60. The obtaining module 10 is configured to obtain consecutive n depth image frames containing a target depth image frame, where n is a natural number greater than 1; the first determining module 20 is configured to determine a trusted pixel in the target depth image frame in accordance with a preset strategy, and determine a smoothing factor corresponding to the trusted pixel; the second determining module 30 is configured to determine a time similarity weight of the target depth image frame with respect to each of other depth image frames in the n depth image frames; the third determining module 40 is configured to determine a content similarity between the trusted pixel and a corresponding pixel in each of the other depth image frames in the n depth image frames; the fourth determining module 50 is configured to determine, based on the content similarity and the smoothing factor, a content similarity weight of the trusted pixel with respect to the corresponding pixel in each of the other depth image frames in the n depth image frames; and the filter module 60 is configured to perform filtering processing on of the trusted pixel based on all time similarity weights and all content similarity weights.

Referring to FIG. 4, an electronic device of an embodiment of the present disclosure includes a memory, a processor, and a computer program stored in the memory and executable on the processor. The computer program, when executed by the processor, implements a depth image processing method. The depth image processing method includes following steps of: obtaining consecutive n depth image frames containing a target depth image frame, where n is a natural number greater than 1; determining a trusted pixel in the target depth image frame in accordance with a preset strategy, and determining a smoothing factor corresponding to the trusted pixel; determining a time similarity weight of the target depth image frame with respect to each of other depth image frames in the n depth image frames; determining a content similarity between the trusted pixel and a corresponding pixel in each of the other depth image frames in the n depth image frames; determining, based on the content similarity and the smoothing factor, a content similarity weight of the trusted pixel with respect to the corresponding pixel in each of the other depth image frames in the n depth image frames; and performing filtering processing on a depth value of the trusted pixel based on all time similarity weights and all content similarity weights.

In some embodiments, in some embodiments, determining the trusted pixel in the target depth image frame in accordance with the preset strategy includes: obtaining a reference depth image frame adjacent to the target depth image frame; determining a depth difference between a depth value of each pixel in the target depth image frame and a depth value of a corresponding pixel in the reference depth image frame; determining whether the depth difference is smaller than or equal to a preset threshold; and determining the corresponding pixel as the trusted pixel when the depth difference is smaller than or equal to the preset threshold.

In some embodiments, determining the time similarity weight of the target depth image frame with respect to each of the other depth image frames in the n depth image frames includes: obtaining a sequence number of the target depth image frame among the consecutive n depth image frames; and obtaining the time similarity weight through calculation of the sequence number and n in accordance with a preset time weight formula.

In some embodiments, the preset time weight formula is:

$$w1_k = \frac{2(n-k)}{n(n+1)},$$

where $w1_k$ represents the time similarity weight, and k represents the sequence number.

In some embodiments, determining the content similarity between the trusted pixel and the corresponding pixel in each of the other depth image frames in the n depth image frames includes: obtaining a first confidence of the trusted pixel and a second confidence of the corresponding pixel in each of the other depth image frames, and calculating a confidence difference between the first confidence and the second confidence; obtaining a first gray value of the trusted pixel and a second gray value of the corresponding pixel in each of the other depth image frames, and calculating a gray value difference between the first gray value and the second gray value; obtaining a first weight coefficient corresponding to the confidence, and determining a second weight coefficient based on the first weight coefficient; and obtaining the content similarity based on the confidence difference, the gray value difference, the first weight coefficient, and the second weight coefficient.

In some embodiments, determining, based on the content similarity and the smoothing factor, the similarity weight of the trusted pixel with respect to the corresponding pixel in each of the other depth image frames in the n depth image frames includes: determining the content similarity weight of the trusted pixel with respect to the corresponding pixel in each of the other depth image frames in the n depth image frames through calculation of the content similarity and the smoothing factor in accordance with a preset similarity weight formula.

In some embodiments, the preset similarity weight formula is:

$$w2_k = s * \exp\left(-\frac{d * diff1^2 + (1-d) * diff2^2}{2\sigma^2}\right),$$

where s represents the smoothing factor, diff1 represents the confidence difference, diff2 represents the gray value difference, d represents the first weight coefficient, 1−d represents the second weight coefficient, and σ represents a product of a depth value of each trusted pixel and a preset standard error.

In some embodiments, said performing filtering processing on the depth value of the trusted pixel based on all time similarity weights and all content similarity weights includes: smoothing the depth value of the trusted pixel based on a preset filtering formula and the time similarity weight, the content similarity weight and the depth value of the trusted pixel.

In some embodiments, the preset filtering formula is:

$$\sum_{k=0}^{n} w1_k * w2_k * dep_k,$$

where D represents a smoothed depth value of the trusted pixel, and $dep_k$ represents the depth value of the trusted pixel.

Referring to FIG. 5, a depth image processing apparatus according to an embodiment of the present disclosure includes an obtaining module 10, a first determining module 20, a second determining module 30, a third determining module 40, a fourth determining module 50, and a filter module 60. The obtaining module 10 is configured to obtain consecutive n depth image frames containing a target depth image frame, where n is a natural number greater than 1; the first determining module 20 is configured to determine a trusted pixel in the target depth image frame in accordance with a preset strategy, and determine a smoothing factor corresponding to the trusted pixel; the second determining module 30 is configured to determine a time similarity weight of the target depth image frame with respect to each of the other depth image frames in the n depth image frames; the third determining module 40 is configured to determine a content similarity between the trusted pixel and a corresponding pixel in each of the other depth image frames in the n depth image frames; the fourth determining module 50 is configured to determine, based on the content similarity and the smoothing factor, a content similarity weight of the trusted pixel with respect to the corresponding pixel in each of the other depth image frames in the n depth image frames; and the filter module 60 is configured to perform filtering processing on of the trusted pixel based on all time similarity weights and all content similarity weights.

A non-transitory computer-readable storage medium according to an embodiment of the present disclosure has a computer program stored thereon, and the computer program, when executed by a processor, implements the depth image processing method of any one of the above embodiments.

The depth image processing method and apparatus according to the embodiments of the present disclosure will be described below with reference to the accompanying drawings. The depth value in the depth image in the embodiments of the present disclosure is obtained based on a TOF sensor.

In order to enable those skilled in the art to more clearly understand the timing of the depth image processing method of the present disclosure, the entire process of TOF-based depth image processing will be described below in conjunction with FIG. 1. As illustrated in FIG. 1, the ToF sensor emits a modulated pulse signal, a surface of an object to be measured receives the pulse signal and reflects the signal, then the ToF sensor receives the reflected signal, decodes a multi-frequency phase diagram, subsequently performs an error correction on the ToF data based on calibration parameters, then de-aliases multi-frequency signals, converts the depth value from a radial coordinate system to a Cartesian coordinate system, finally performs time-consistent filtering on the depth image, and outputs a relatively smooth depth filtering result in the time dimension of an area with gentle depth changes.

Figure 2:
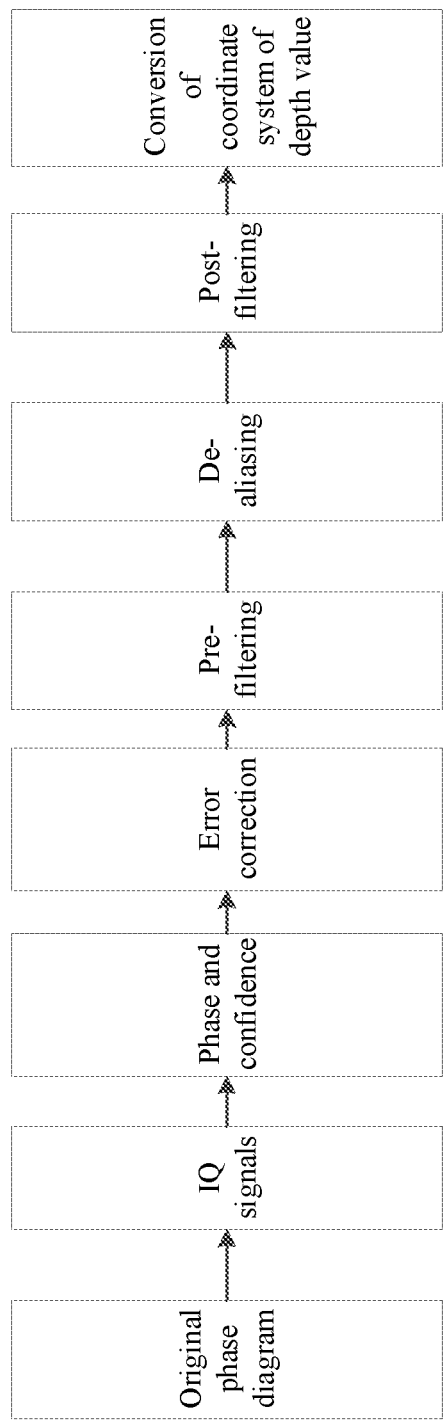
FIG. 2 is a schematic flowchart of a method for calculating an original depth value according to an embodiment of the present disclosure.

The time-consistent depth filtering scheme includes two main stages: a ToF original depth value calculation stage and a time-consistent depth filtering stage. As illustrated in FIG. 2, the ToF original depth value calculation stage includes: calculating an IQ signal of each pixel based on an original phase diagram (four-phase diagram in a single-frequency mode or eight-phase diagram in a dual-frequency mode, assuming a dual-frequency mode in this embodiment) acquired by the ToF sensor; calculating a phase and a confidence of each pixel based on the IQ signals, where the confidence indicates a credibility of the phase value of the point, and reflects a magnitude of the energy of the point; online correcting several errors, including a cycle error, a temperature error, a gradient error, a parallax error, etc., based on internal parameters of a ToF off-line calibration; performing pre-filtering before aliasing the dual frequencies to filter out noises in each frequency mode separately; aliasing the dual frequencies after filtering out the noises of the dual frequencies; determining a true number of cycles of each pixel; performing post-filtering on the aliased result based on the true number of cycles; and converting the post-filtered radial coordinate system to a Cartesian coordinate system for processing of a next step.

Figure 3:
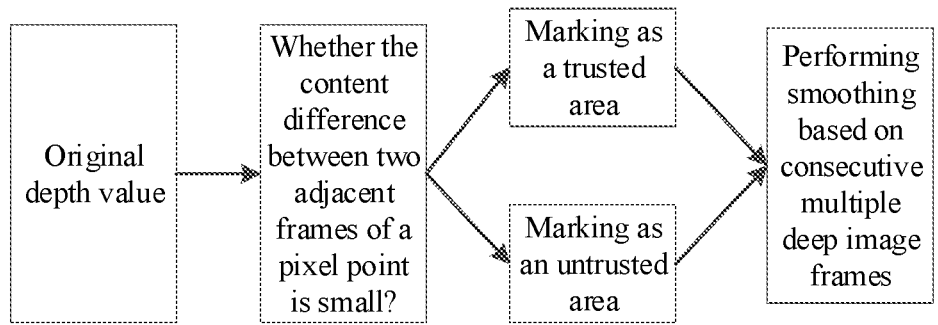
FIG. 3 is a schematic flowchart of a time-consistent filtering method according to an embodiment of the present disclosure.

As illustrated in FIG. 3, in an embodiment of the present disclosure, the time-consistent depth filtering stage includes: iterating each pixel after the original depth value contained in the original depth image in the Cartesian coordinate system is obtained; determining whether a content difference of each pixel between adjacent frames is small; determining, when the content difference is small, the pixel as a trusted pixel in an area with slow depth changes, and otherwise, determining the pixel as an untrusted pixel with a large dynamic depth range; separately smoothing a trusted area where the trusted pixel is located and an untrusted area where the untrusted pixel is located in accordance with a mask mode, that is, counting masks of trusted areas and smoothing the areas separately according to the masks. In the present disclosure, smoothing is performed mainly based on a plurality of consecutive depth image frames.

If the error of the depth value is fixed within a certain period of time, that is, it is time-consistent, it will be of great significance for our accurate calculation of the depth value. Therefore, there is an urgent need for a method to ensure that the depth error is time-consistent within a short time without the jump of the error of the depth value.

The depth image processing method in the present disclosure is mainly illustrated by focusing on the smoothing process based on a plurality of consecutive depth image frames illustrated in FIG. 3 above. FIG. 4 is a flowchart of a depth image processing method according to an embodiment of the present disclosure. As illustrated in FIG. 4, the depth image processing method includes the following steps.

At step 101, consecutive n depth image frames containing a target depth image frame are obtained, where n is a natural number greater than 1.

The target image frame is a current depth image frame to be processed. Depth smoothing is performed on the target image frame based on the consecutive multiple depth image frames containing the target image frame. The reference to the depth values of consecutive multiple frames can ensure the depth error of the filtered target depth image frame is smoother in time.

It should be noted that n is greater than 1, and the magnitude of n depends on an acquisition frequency of the TOF sensor. Generally, the higher the acquisition frequency, the greater the number of consecutive frames that may have a great similarity in depth values, and the greater the value of n.

At step 102, a trusted pixel in the target depth image frame is determined in accordance with a preset strategy, and a smoothing factor corresponding to the trusted pixel is determined.

It should be understood that the target depth image frame may include an area with rapid depth changes and an area with slow depth changes. The area with slow depth changes can be regarded as a trusted area, and the depth value of the trusted pixel in the trusted area may have small fluctuations between adjacent frames, which fluctuations may be caused by the jump of the depth measurement error. Since a time consistency-based filtering is to be performed on the depth value of the trusted pixel, the area with rapid depth changes can be regarded as an untrusted area, and the depth value of the untrusted pixel in the untrusted area may fluctuate greatly between adjacent frames. This large depth value change usually contains high dynamic information of the depth value. Therefore, the depth value of the untrusted pixel is smoothed to a lesser degree, or the depth value of the untrusted pixel can be directly retained. In this embodiment, the description is made mainly for the time consistency-based filtering of the trusted pixel.

Therefore, in order to perform time-consistent filtering on the trusted pixel of the target depth image frame, in the embodiment of the present disclosure, the trusted pixel in the target depth image frame is first determined in accordance with a preset strategy.

It should be noted that in different application scenarios, the ways to determine the trusted pixel in the target depth image frame in accordance with the preset strategy are different. Examples are as follows.

Example 1

In this example, a reference depth image frame adjacent to the target depth image frame is obtained; a depth difference between a depth value of each pixel in the target depth image frame and a depth value of a corresponding pixel in the reference depth image frame is determined; whether the depth difference is smaller than or equal to a preset threshold is determined, the preset threshold being calibrated according to empirical values; when the depth difference is smaller than or equal to the preset threshold, the corresponding pixel is determined as a trusted pixel, i.e., a pixel in an area with slow depth changes.

Example 2

In this example, a reference depth image frame adjacent to the target depth image frame is obtained; a gray value difference between a gray value of each pixel in the target depth image frame and a gray value of a corresponding pixel in the reference depth image frame is determined; whether the gray value difference is smaller than or equal to a preset threshold is determined, the preset threshold being calibrated according to empirical values; and when the gray value difference is smaller than or equal to the preset threshold, the corresponding pixel is determined as a trusted pixel, that is, a pixel in an area with slow depth changes.

Example 3

In this example, a reference depth image frame adjacent to the target depth image frame is obtained; a confidence difference between a confidence of a depth value of each pixel in the target depth image frame and a confidence of a depth value of a corresponding pixel in the reference depth image frame is determined; whether the confidence difference is smaller than or equal to a preset threshold is determined, the preset threshold being calibrated according to empirical values; when the confidence difference is smaller than or equal to the preset threshold, the corresponding pixel is determined as a trusted pixel, that is, a pixel in an area with slow depth changes.

Further, after the trusted pixel is determined, the smoothing factor corresponding to the trusted pixel is determined, and the depth value of the trusted pixel can be smoothed based on the smoothing factor.

It should be noted that in different application scenarios, the ways to determine the smoothing factor corresponding to the trusted pixel are different. Examples are as follows.

Example 1

In this example, an absolute value of a difference between the depth difference and the preset threshold is determined, and the preset threshold corresponds to an average difference of the depth difference. When the depth difference is smaller than the average difference, the greater an absolute value of a difference between the depth difference and the average difference, the greater the possibility that the trusted pixel and a corresponding second pixel in the adjacent depth image frame are pixels for the same point of an object. A factor increase value is determined based on the difference. For example, a correspondence relationship between the factor increase value and the difference between the depth difference and the preset threshold is pre-established, the corresponding factor increase value is obtained based on the correspondence relationship, and the smoothing factor is determined based on a sum of the factor increase value and an initial smoothing factor, that is, a suitable increase is made to the initial smoothing factor. In this way, each pixel is smoothed to a different degree, which improves the smoothing effect.

Example 2

In this example, each trusted pixel is separately configured with a fixed smoothing factor, for example, the smoothing factor corresponding to the trusted pixel is 1 is determined. In this way, the efficiency of smoothing is improved.

At step 103, a time similarity weight of the target depth image frame with respect to each of other depth image frames in the n depth image frames is determined.

It is easy to understand that an acquisition time difference between depth image frames reflects the similarity between adjacent depth image frames to a certain extent. In theory, the smaller the acquisition time difference of two adjacent image frames is, the more similar the two are. Otherwise, the greater the acquisition time difference of two adjacent image frames is, the more different the two are. Therefore, in this embodiment, the acquisition time of the target depth image frame and the acquisition time of each of the other depth image frames in then depth image frames are obtained, and the corresponding time similarity weight is determined based on the acquisition time of the two, which ensures the time consistency of the filter processing in the area with gentle depth changes in the depth image frame.

Based on this, it is apparent that as the acquisition time difference increases, the difference between the target depth image frame and the corresponding depth image frame increases, and the time similarity weight decreases. Therefore, the filter processing of the target depth image frame is performed based on the time similarity weight.

It should be noted that in different application scenarios, the ways to determine the time similarity weight of the target depth image frame with respect to each of other depth image frames in the n depth image frames are different. Examples are as follows.

Example 1

In this example, the acquisition time of the target depth image frame and the acquisition time difference between the acquisition time of the target depth image frame and the acquisition time of each of the other depth image frames of the n depth image frames are obtained. A time difference weight is obtained based on a time weight calculation formula and the acquisition time difference. The time weight calculation formula is the following formula (1):

$$t = \frac{(t_{max} - (t_{gap} - t_{std}))}{t_{max}}, \tag{1}$$

where t represents the time similarity weight, $t_{gap}$ represents the acquisition time difference, $t_{max}$ represents a preset maximum acquisition time difference between two frames, the maximum acquisition time difference is system calibrated, $t_{std}$ represents a preset standard acquisition time difference between the two frames, and the standard acquisition time difference is a theoretical time difference of the TOF sensor for acquiring depth image frames.

Example 2

In this example, a sequence number of the target depth image frame in the consecutive multiple depth image frames also determines the similarity between the target depth image frame and the corresponding depth image frame. Therefore, a sequence number of the target depth image frame in the consecutive n depth image frames is obtained. For example, n is 10, the target depth image frame is a 9th depth image frame of the 10 depth image frames, and the sequence number is 9. The time similarity weight is obtained through calculation of the sequence number and n in accordance with a preset time weight formula.

In this example, the preset time weight formula may be as illustrated in the following formula (2):

$$w1_k = \frac{2(n-k)}{n(n+1)}, \tag{2}$$

where $w1_k$ represents the time similarity weight, and k represents the sequence number.

At step 104, a content similarity between the trusted pixel and a corresponding pixel in each of the other depth image frames in the n depth image frames is determined.

At step 105, a content similarity weight of the trusted pixel with respect to the corresponding pixel in each of the other depth image frames in the n depth image frames is determined based on the content similarity and the smoothing factor.

The content referred to by the content similarity may be a similarity in a confidence or a gray value or the like of the depth value between the trusted pixel and a corresponding pixel in each of the other depth image frames in the n depth image frames.

It is easy to understand that the content difference between depth image frames reflects the similarity between adjacent depth image frames to a certain extent. In theory, the smaller the content difference between two depth image frames, the more similar the two; otherwise, the greater the content difference between two depth image frames, the more different the two. Therefore, in this embodiment, a content value of the trusted pixel and a content value of the corresponding pixel in each of the other depth image frames in the n depth image frames are obtained, and the corresponding content similarity is determined based on a content difference between the two, which ensures the time consistency of the filtering in the area with gentle depth changes in the depth image frame.

It should be noted that in different application scenarios, the ways to determine the content similarity between the trusted pixel and the corresponding pixel in each of the other depth image frames in the n depth image frames are different. Examples are as follows.

Example 1

In this example, a content difference in a content value between the trusted pixel and the corresponding pixel in each of the other depth image frames in the n depth image frames is obtained, and a content similarity corresponding to the content difference is determined based on a correspondence relationship between a preset content difference and the content similarity.

Example 2

In this example, a first confidence of the trusted pixel and a second confidence level of the corresponding pixel in each of the other depth image frames are obtained, a confidence difference between the first confidence and the second confidence is calculated, a first gray value of the trusted pixel and a second gray value of the corresponding pixel in each of the other depth image frames are obtained, a gray value difference between the first gray value and the second gray value is calculated, a first weight coefficient corresponding to the confidence is obtained, and a second weight coefficient is determined based on the first weight coefficient. The first weight coefficient is determined according to application needs. The higher the first weight coefficient, the more consideration the confidence of the depth difference between pixels is given in the current smoothing. The second weight coefficient may be inversely proportional to the first weight coefficient, for example, the first weight coefficient is equal to 1 minus the second weight coefficient, etc., thereby ensuring that in the same smoothing scenario, the consideration on the gray value difference and the consideration on the confidence difference of the depth values have different focuses.

Further, the content similarity is obtained based on the confidence difference, the gray value difference, the first weight coefficient and the second weight coefficient, and the content similarity weight of the trusted pixel with respect to the corresponding pixel in each of the other depth image frames of the n depth image frames is determined based on the content similarity and the smoothing factor.

As a possible implementation, the content similarity weight of the trusted pixel with respect to the corresponding pixel in each of the other depth image frames in the n depth image frames is determined through calculation of the content similarity and the smoothing factor in accordance with a preset content weight formula. The preset content weight formula may be the following formula (3):

$$w2_k = s * \exp\left(-\frac{d * diff1^2 + (1-d) * diff2^2}{2\sigma^2}\right), \quad (3)$$

where s represents the smoothing factor, diff1 represents the confidence difference, diff2 represents the gray value difference, d represents the first weight coefficient, 1−d represents the second weight coefficient, and σ represents a product of a depth value of each trusted pixel and a preset standard error. The preset standard error is an empirical measurement error of the depth value caused by temperature error, etc., and can be 1%, etc.

At step 106, filtering processing is performed on a depth value of the trusted pixel based on all time similarity weights and all content similarity weights.

Specifically, the time consistency-based filter processing is performed on the trusted pixel by iterating the time similarity weights and the content similarity weights of consecutive multiple frames, effectively making the depth value of the area with gentle depth changes smoother in the time dimension.

As a possible implementation, the depth value of the trusted pixel is smoothed based on a preset filtering formula and all time similarity weights, all content similarity weights, and the depth value of the trusted pixel. In this example, the preset filtering formula may be as illustrated in the following formula (4):

$$D = \sum_{k=0}^{n} w1_k * w2_k * dep_k, \quad (4)$$

where D represents a smoothed depth value of the trusted pixel, and $dep_k$ represents the depth value of the trusted pixel.

As another possible implementation, a depth model can be constructed in advance based on a large amount of experimental data. The inputs of the depth model are the time similarity weight and the content similarity weight, and the output of the depth model is a filtered depth value. Therefore, the content similarity weight of the trusted pixel with respect to the corresponding pixel in the corresponding depth image frame, and the time similarity weight of the trusted pixel with respect to the corresponding depth image frame are respectively input to the depth model to obtain the filtered depth value of the trusted pixel with respect to the corresponding depth image frame. After n filtered depth values are obtained, an average value of a sum of the n filtered depth values is used as the depth value of the trusted pixel after filtering, so as to realize the filtering of the trusted pixel.

Given the above, the depth image processing method of the embodiment of the present disclosure determines the trusted pixel in the target depth image frame to be processed, and also considers the time similarity and content similarity between the target depth image frame and consecutive multiple depth image frames, effectively making the depth value of the area with gentle depth changes smoother in the time dimension, while maintaining the original high dynamics of the area with rapid depth changes.

In order to implement the above-mentioned embodiments, the present disclosure also provides a depth image processing apparatus. FIG. 5 is a schematic diagram of a structure of a depth image processing apparatus according to an embodiment of the present disclosure. As illustrated in FIG. 5, the depth image processing apparatus includes: an obtaining module 10, a first determining module 20, a second determining module 30, a third determining module 40, a fourth determining module 50, and a filter module 60.

The obtaining module 10 is configured to obtain consecutive n depth image frames containing a target depth image frame, where n is a natural number greater than 1.

The first determining module 20 is configured to determine a trusted pixel in the target depth image frame in accordance with a preset strategy, and determine a smoothing factor corresponding to the trusted pixel.

It should be noted that in different application scenarios, the ways for the first determining module 20 to determine the trusted pixel in the target depth image frame in accordance with to the preset strategy are different. Examples are as follows.

Example 1

In this example, the first determining module 20 obtains a reference depth image frame adjacent to the target depth image frame, determines a depth difference between a depth value of each pixel in the target depth image frame and a depth value of a corresponding pixel in the reference depth image frame, determines whether the depth difference is smaller than or equal to a preset threshold which is calibrated according to empirical values, and determines the corresponding pixel as a trusted pixel, i.e., a pixel in an area with slow depth changes, when the depth difference is smaller than or equal to the preset threshold.

Example 2

In this example, the first determining module 20 obtains a reference depth image frame adjacent to the target depth image frame, determines a gray value difference between a gray value of each pixel in the target depth image frame and a gray value of a corresponding pixel in the reference depth image frame, determines whether the gray value difference is smaller than or equal to a preset threshold which is calibrated according to empirical values; and determines the corresponding pixel as a trusted pixel, i.e., a pixel in an area with slow depth changes, when the gray value difference is smaller than or equal to the preset threshold.

Example 3

In this example, the first determining module 20 obtains a reference depth image frame adjacent to the target depth image frame, determines a confidence difference between a confidence of a depth value of each pixel in the target depth image frame and a confidence of a depth value of a corresponding pixel in the reference depth image frame, determines whether the confidence difference is smaller than or equal to a preset threshold which is calibrated according to empirical values, and determines the corresponding pixel as a trusted pixel, i.e., a pixel in an area with slow depth changes, when the confidence difference is smaller than or equal to the preset threshold.

Further, after determining the trusted pixel, the first determining module 20 determines the smoothing factor corresponding to the trusted pixel, so as to smooth the depth value of the trusted pixel based on the smoothing factor.

The second determining module 30 is configured to determine a time similarity weight of the target depth image frame with respect to each of other depth image frames in the n depth image frames.

It should be noted that in different application scenarios, the ways for the second determining module 30 to determine the time similarity weight of the target depth image frame with respect to each of the other depth image frames in the n depth image frames are different. Examples are as follows.

Example 1

In this example, the second determining module 30 obtains the acquisition time of the target depth image frame, and the acquisition time difference between the acquisition time of the target depth image frame and each of other depth image frames in the n depth image frames, and obtains a time difference weight based on the time weight calculation formula and the acquisition time difference. The time weight calculation formula is the following formula (1):

$$t = \frac{(t_{max} - (t_{gap} - t_{std}))}{t_{max}}, \qquad (1)$$

where t represents the time similarity weight, $t_{gap}$ represents the acquisition time difference, $t_{max}$ represents a preset maximum acquisition time difference between two frames, the maximum acquisition time difference is system calibrated, and $t_{std}$ represents a preset standard acquisition time difference between two frames, and the standard acquisition time difference is a theoretical time difference for the TOF sensor to acquire depth image frames.

Example 2

In this example, the sequence number of the target depth image frame in the consecutive multiple depth image frames also determines the similarity between the target depth image frame and the corresponding depth image frame. Therefore, the second determining module 30 obtains the sequence number of the target depth image frame in the consecutive n depth image frames, and obtains time similarity weight through calculation of the sequence number and n in accordance with a preset time weight formula. For example, n is 10, the target depth image frame is a 9th depth image frame of the 10 depth image frames, and the sequence number is 9.

In this example, the preset time weight formula may be as illustrated in the following formula (2):

$$w1_k = \frac{2(n-k)}{n(n+1)}, \qquad (2)$$

where $w1_k$ represents the time similarity weight, and k represents the sequence number.

The third determining module 40 is configured to determine a content similarity between the trusted pixel and the corresponding pixel in each of the other depth image frames in the n depth image frames.

The fourth determining module 50 is configured to determine a content similarity weight of the trusted pixel with respect to the corresponding pixel in each of the other depth image frames in the n depth image frames based on the content similarity and the smoothing factor.

It should be noted that in different application scenarios, the ways to determine the content similarity between the trusted pixel and the corresponding pixel in each of the other depth image frames in the n depth image frames are different. Examples are as follows.

Example 1

In this example, the third determining module 40 obtains a content difference between a content value of the trusted pixel and a content value of the corresponding pixel in each of the other depth image frames of the n depth image frames, and determines a content similarity corresponding to the content difference based on a preset correspondence relationship between the content difference and the content similarity.

Example 2

In this example, the third determining module 40 obtains a first confidence of the trusted pixel and a second confidence of the corresponding pixel in each of the other depth image frames, calculates a confidence difference between the first confidence and the second confidence, obtains a first gray value of the trusted pixel and a second gray value of the corresponding pixel in each of the other depth image frames, calculates a gray value difference between the first gray value and the second gray value, obtains a first weight coefficient corresponding to the confidence, and determines a second weight coefficient based on the first weight coefficient. The first weight coefficient is determined according to application needs. The higher the first weight coefficient, the more consideration the confidence of the depth difference between pixels is given in the current smoothing. The second weight coefficient may be inversely proportional to the first weight coefficient, for example, the first weight coefficient is equal to 1 minus the second weight coefficient, etc., thereby ensuring that in the same smoothing scenario, the consideration on the gray value difference and the consideration on the confidence difference of the depth values have different focuses.

Further, the fourth determining module 50 obtains a content similarity based on the confidence difference, the gray value difference, the first weight coefficient and the second weight coefficient, and determines a content similarity weight of the trusted pixel with respect to the corresponding pixel in each of the other depth image frame of the n depth image frames based on the content similarity and the smoothing factor.

The filter module 60 is configured to perform filtering processing on of the trusted pixel based on all time similarity weights and all content similarity weights.

Specifically, the filter module 60 iterates the time similarity weights and content similarity weights of consecutive multiple frames, and performs time consistency-based filtering processing on the trusted pixel, which effectively makes the depth value of the area with smooth depth changes smoother in the time dimension.

In summary, the depth image processing apparatus of the embodiment of the present disclosure determines the trusted pixel in the target depth image frame to be processed, and also considers the time similarity and content similarity between the target depth image frame and consecutive multiple frames, effectively making the depth value of the area with gentle depth changes smoother in the time dimension, while maintaining the original high dynamics of the area with rapid depth changes.

In order to implement the foregoing embodiments, the present disclosure also provides an electronic device, including a memory, a processor, and a computer program stored in the memory and executable on the processor. The computer program, when executed by the processor, implements the depth image processing method as described in the forgoing embodiment.

In order to implement the above-mentioned embodiments, the present disclosure also provides a non-transitory computer-readable storage medium having a computer program stored thereon, and the computer program, when executed by a processor, implements the depth image processing method as described in the forgoing embodiment.

In the description of this specification, descriptions with reference to the terms "one embodiment", "some embodiments", "examples", "specific examples", or "some examples" etc. mean specific features, structures, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any suitable manner in one or more embodiments or examples. In addition, different embodiments or examples and the features of the different embodiments or examples described in this specification may be combined or integrated by those skilled in the art without contradicting each other.

In addition, terms such as "first" and "second" are only used herein for purposes of description, and are not intended to indicate or imply relative importance or implicitly indicate the number of indicated technical features. Therefore, the features defined with "first" and "second" may explicitly or implicitly include at least one of the features. In the description of the present disclosure, "a plurality of" means at least two, such as two, three, etc., unless specified otherwise.

Any process or method description in the flowchart or described in other ways herein can be understood to include one or more modules, segments or portions of codes of executable instructions for achieving specific logic functions or steps in the process, and the scope of the preferred embodiments of the present disclosure includes additional implementations, which may implement functions in an order rather than the order shown or discussed, including implementing the functions in a substantially simultaneous manner or in a reverse order depending on the functions involved. This should be understood by those skilled in the art to which the embodiments of the present disclosure belong.

For example, the logic and/or steps represented in the flowchart or described in other manners herein can be considered as a sequenced list of executable instructions for implementing logic functions, and can be embodied in any computer-readable medium to be used by instruction execution systems, apparatuses, or devices (such as computer-based systems, systems including processors, or other systems that can read and execute instructions from instruction execution systems, apparatuses, or devices), or for use in combination with these instruction execution systems, apparatuses or devices. For the purposes of this specification, a "computer-readable medium" may be any device that can contain, store, communicate, propagate, or transmit a program to be used by instruction execution systems, apparatuses, or devices or in combination with these instruction execution systems, apparatuses, or devices. More specific examples (non-exhaustive list) of computer-readable media include: electrical connections (electronic devices) with one or more wirings, portable computer disk cases (magnetic devices), random access memory (RAM), read-only memory (ROM), erasable and editable read-only memory (EPROM or flash memory), optical fiber devices, and portable compact disk read-only memory (CDROM). In addition, the computer-readable medium may even be a paper or other appropriate media capable of printing programs thereon, because the program can be obtained electronically for example by optically scanning the paper or other media, and then editing, interpreting, or processing in other suitable manners if necessary, and then stored in the computer memory.

It should be understood that various parts of the present disclosure may be implemented by hardware, software, firmware, or a combination thereof. In the above embodiments, multiple steps or methods can be implemented by software or firmware stored in a memory and executed by a suitable instruction execution system. For example, if it is implemented by hardware as in another embodiment, it may be implemented by any one of or a combination of the following technologies known in the art: discrete logic circuits with logic gate circuits for implementing logic functions on data signals, application specific integrated circuits with suitable combinational logic gate circuits, programmable gate array (PGA), field programmable gate array (FPGA), etc.

It would be understood by those skilled in the art that all or part of the steps carried in the method of the foregoing embodiments may be implemented by a program instructing relevant hardware. The program may be stored in a computer-readable storage medium. When the program is executed, one or a combination of the steps of the method in the above-described embodiments may be completed.

In addition, the functions in the various embodiments of the present disclosure may be integrated into one processing module, or may be separately physically present, or two or more may be integrated into one module. The above-mentioned integrated modules may be implemented in the form of hardware, or may be implemented in the form of a software functional module. When the integrated module is implemented in the form of a software function module and sold or used as a separate product, it may also be stored in a computer readable storage medium.

The above-mentioned storage medium may be a read-only memory, a magnetic disk, or an optical disk, etc. Although the embodiments of the present disclosure have been shown and described above, it can be understood by those skilled in the art that the above-mentioned embodiments are exemplary and should not be construed as limiting the present disclosure, and changes, modifications, substitutions, and variations can be made in the foregoing embodiments without departing from scope of the present disclosure.

What is claimed is:

1. A depth image processing method, comprising:
   obtaining consecutive n depth image frames containing a target depth image frame, wherein n is a natural number greater than 1;
   determining a trusted pixel in the target depth image frame in accordance with a preset strategy, and determining a smoothing factor corresponding to the trusted pixel;
   determining a time similarity weight of the target depth image frame with respect to each of other depth image frames other than the target image frame in the n depth image frames;
   determining a content similarity between the trusted pixel and a corresponding pixel in each of the other depth image frames in the n depth image frames;
   determining, based on the content similarity and the smoothing factor, a content similarity weight of the trusted pixel with respect to the corresponding pixel in each of the other depth image frames in the n depth image frames; and
   performing filtering processing on a depth value of the trusted pixel based on the determined time similarity weights and the determined content similarity weights.

2. The method according to claim 1, wherein said determining the trusted pixel in the target depth image frame in accordance with the preset strategy comprises:
   obtaining a reference depth image frame adjacent to the target depth image frame;
   determining a depth difference between a depth value of each pixel in the target depth image frame and a depth value of a corresponding pixel in the reference depth image frame; and
   determining the pixel in the target depth image frame as the trusted pixel in response to determining that the depth difference is smaller than or equal to the preset threshold.

3. The method according to claim 1, wherein said determining the time similarity weight of the target depth image frame with respect to each of the other depth image frames in the n depth image frames comprises:
   obtaining a sequence number of the target depth image frame among the consecutive n depth image frames; and
   obtaining the time similarity weight through calculation of the sequence number and n in accordance with a preset time weight formula.

4. The method according to claim 3, wherein the preset time weight formula is:

$$w1_k = \frac{2(n-k)}{n(n+1)},$$

where $w1_k$ represents the time similarity weight, and k represents the sequence number.

5. The method according to claim 1, wherein said determining the content similarity between the trusted pixel and the corresponding pixel in each of the other depth image frames in the n depth image frames comprises:
   obtaining a first confidence of the trusted pixel and a second confidence of the corresponding pixel in each of the other depth image frames, and obtaining a confidence difference between the first confidence and the second confidence;
   obtaining a first gray value of the trusted pixel and a second gray value of the corresponding pixel in each of the other depth image frames, and obtaining a gray value difference between the first gray value and the second gray value; obtaining a first weight coefficient corresponding to the confidence difference, and determining a second weight coefficient based on the first weight coefficient; and obtaining the content similarity based on the confidence difference, the gray value difference, the first weight coefficient, and the second weight coefficient.

6. The method according to claim 5, wherein said determining, based on the content similarity and the smoothing factor, the similarity weight of the trusted pixel with respect to the corresponding pixel in each of the other depth image frames in the n depth image frames comprises:

determining the content similarity weight of the trusted pixel with respect to the corresponding pixel in each of the other depth image frames in the n depth image frames through calculation of the content similarity and the smoothing factor in accordance with a preset similarity weight formula.

7. The method according to claim 6, wherein the preset similarity weight formula is:

$$w2_k = s * \exp\left(-\frac{d * diff1^2 + (1-d) * diff2^2}{2\sigma^2}\right),$$

where s represents the smoothing factor, diff1 represents the confidence difference, diff2 represents the gray value difference, d represents the first weight coefficient, 1−d represents the second weight coefficient, and σ represents a product of a depth value of each trusted pixel and a preset standard error.

8. The method according to claim 1, wherein said performing filtering processing on the depth value of the trusted pixel based on all time similarity weights and all content similarity weights comprises:

smoothing the depth value of the trusted pixel based on a preset filtering formula and the time similarity weight, the content similarity weight and the depth value of the trusted pixel.

9. The method according to claim 8, wherein the preset filtering formula is:

$$D = \sum_{k=0}^{n} w1_k * w2_k * dep_k,$$

where D represents a smoothed depth value of the trusted pixel, and $dep_k$ represents the depth value of the trusted pixel.

10. An electronic device, comprising a memory, a processor, and a computer program stored on the memory and executable on the processor, wherein the computer program, when executed by the processor, implements a depth image processing method comprising:

obtaining consecutive n depth image frames containing a target depth image frame, wherein n is a natural number greater than 1;

determining a trusted pixel in the target depth image frame in accordance with a preset strategy, and determining a smoothing factor corresponding to the trusted pixel;

determining a time similarity weight of the target depth image frame with respect to each of other depth image frames other than the target image frame in the n depth image frames;

determining a content similarity between the trusted pixel and a corresponding pixel in each of the other depth image frames in the n depth image frames;

determining, based on the content similarity and the smoothing factor, a content similarity weight of the trusted pixel with respect to the corresponding pixel in each of the other depth image frames in the n depth image frames; and performing filtering processing on a depth value of the trusted pixel based on the determined time similarity weights and the determined content similarity weights.

11. The electronic device according to claim 10, wherein said determining the trusted pixel in the target depth image frame in accordance with the preset strategy comprises:

obtaining a reference depth image frame adjacent to the target depth image frame;

determining a depth difference between a depth value of each pixel in the target depth image frame and a depth value of a corresponding pixel in the reference depth image frame; and determining the pixel in the target depth image frame as the trusted pixel in response to determining that the depth difference is smaller than or equal to the preset threshold.

12. The electronic device according to claim 10, wherein said determining the time similarity weight of the target depth image frame with respect to each of the other depth image frames in the n depth image frames comprises:

obtaining a sequence number of the target depth image frame among the consecutive n depth image frames; and obtaining the time similarity weight through calculation of the sequence number and n in accordance with a preset time weight formula.

13. The electronic device according to claim 12, wherein the preset time weight formula is:

$$w1_k = \frac{2(n-k)}{n(n+1)},$$

where $w1_k$ represents the time similarity weight, and k represents the sequence number.

14. The electronic device according to claim 10, wherein said determining the content similarity between the trusted pixel and the corresponding pixel in each of the other depth image frames in the n depth image frames comprises:

obtaining a first confidence of the trusted pixel and a second confidence of the corresponding pixel in each of the other depth image frames, and obtaining a confidence difference between the first confidence and the second confidence;

obtaining a first gray value of the trusted pixel and a second gray value of the corresponding pixel in each of the other depth image frames, and obtaining a gray value difference between the first gray value and the second gray value; obtaining a first weight coefficient corresponding to the confidence difference, and determining a second weight coefficient based on the first weight coefficient; and obtaining the content similarity based on the confidence difference, the gray value difference, the first weight coefficient, and the second weight coefficient.

15. The electronic device according to claim 14, wherein said determining, based on the content similarity and the smoothing factor, the similarity weight of the trusted pixel with respect to the corresponding pixel in each of the other depth image frames in the n depth image frames comprises:

determining the content similarity weight of the trusted pixel with respect to the corresponding pixel in each of the other depth image frames in the n depth image frames through calculation of the content similarity and the smoothing factor in accordance with a preset similarity weight formula.

16. The electronic device according to claim 15, wherein the preset similarity weight formula is:

$$w2_k = s * \exp\left(-\frac{d*diff1^2 + (1-d)*diff2^2}{2\sigma^2}\right),$$

where s represents the smoothing factor, diff1 represents the confidence difference, diff2 represents the gray value difference, d represents the first weight coefficient, 1−d represents the second weight coefficient, and σ represents a product of a depth value of each trusted pixel and a preset standard error.

17. The electronic device according to claim 10, wherein said performing filtering processing on the depth value of the trusted pixel based on all time similarity weights and all content similarity weights comprises:
smoothing the depth value of the trusted pixel based on a preset filtering formula and the time similarity weight, the content similarity weight and the depth value of the trusted pixel.

18. The electronic device according to claim 17, wherein the preset filtering formula is:

$$D = \sum_{k=0}^{n} w1_k * w2_k * dep_k,$$

where D represents a smoothed depth value of the trusted pixel, and $dep_k$ represents the depth value of the trusted pixel.

19. A non-transitory computer-readable storage medium having a computer program stored thereon, wherein the computer program, when executed by a processor, implements a depth image processing method comprising:
obtaining consecutive n depth image frames containing a target depth image frame, wherein n is a natural number greater than 1;
determining a trusted pixel in the target depth image frame in accordance with a preset strategy, and determining a smoothing factor corresponding to the trusted pixel;
determining a time similarity weight of the target depth image frame with respect to each of other depth image frames other than the target image frame in the n depth image frames;
determining a content similarity between the trusted pixel and a corresponding pixel in each of the other depth image frames in the n depth image frames;
determining, based on the content similarity and the smoothing factor, a content similarity weight of the trusted pixel with respect to the corresponding pixel in each of the other depth image frames in the n depth image frames; and
performing filtering processing on a depth value of the trusted pixel based on the determined time similarity weights and the determined content similarity weights.

20. The non-transitory computer-readable storage medium according to claim 19, wherein said determining the trusted pixel in the target depth image frame in accordance with the preset strategy comprises:
obtaining a reference depth image frame adjacent to the target depth image frame;
determining a depth difference between a depth value of each pixel in the target depth image frame and a depth value of a corresponding pixel in the reference depth image frame; and
determining the pixel in the target depth image frame as the trusted pixel in response to determining that the depth difference is smaller than or equal to the preset threshold.

* * * * *